US012057030B2

United States Patent
Yang et al.

(10) Patent No.: US 12,057,030 B2
(45) Date of Patent: Aug. 6, 2024

(54) SIMULATOR FOR EMERGENCY TREATMENT TRAINING

(71) Applicant: BT INC., Goyang-si (KR)

(72) Inventors: Seung Jin Yang, Uijeongbu-si (KR); Nam Hyuk Kim, Goyang-si (KR); Seung Hun Jeong, Goyang-si (KR)

(73) Assignee: BT INC., Goyang-si (KR)

( * ) Notice: Subject to any disclaimer, the term of this patent is extended or adjusted under 35 U.S.C. 154(b) by 456 days.

(21) Appl. No.: 17/573,984

(22) Filed: Jan. 12, 2022

(65) Prior Publication Data

US 2023/0076333 A1    Mar. 9, 2023

(30) Foreign Application Priority Data

Sep. 6, 2021 (KR) ........................ 10-2021-0118604

(51) Int. Cl.
*G09B 23/30* (2006.01)
*G09B 23/28* (2006.01)

(52) U.S. Cl.
CPC ........... *G09B 23/288* (2013.01); *G09B 23/30* (2013.01)

(58) Field of Classification Search
CPC .............................. G09B 23/288; G09B 23/30
See application file for complete search history.

(56) References Cited

U.S. PATENT DOCUMENTS

| | | | |
|---|---|---|---|
| 6,336,047 B1 * | 1/2002 | Thu ...................... | A61N 1/0492 607/30 |
| 9,286,809 B2 | 3/2016 | Yang et al. | |
| 2009/0148821 A1 * | 6/2009 | Carkner ............... | G09B 23/288 434/350 |

(Continued)

FOREIGN PATENT DOCUMENTS

| | | |
|---|---|---|
| KR | 20-2011-0008408 U | 8/2011 |
| KR | 10-2014-0046321 A | 4/2014 |
| KR | 10-2015-0058382 A | 5/2015 |

(Continued)

OTHER PUBLICATIONS

Korean Office Action issued on Jun. 12, 2023, in counterpart Korean Patent Application No. 10-2021-0118604 (5 pages in English, 5 pages in Korean).

*Primary Examiner* — Robert P Bullington, Esq.
(74) *Attorney, Agent, or Firm* — NSIP Law

(57) ABSTRACT

In a simulator for emergency treatment training, a chest compression training module measures chest compression training information, an artificial respiration training module measures respiration training information, an automated external defibrillator training module measures pad attachment training information, and a compression training module measures hemostatic compression training information. A control unit is installed in a trunk of a manikin and obtains pieces of training information from the chest compression training module, the artificial respiration training module, the automated external defibrillator training module, and the hemostatic compression training module. A monitoring apparatus is connected to the control unit in a wired or wireless manner, receives the pieces of the training information from the control unit, executes an evaluation program, generates an evaluation result, and displays the generated evaluation result on a screen.

7 Claims, 20 Drawing Sheets

(56) References Cited

U.S. PATENT DOCUMENTS

2015/0221238 A1\* 8/2015 Huebner ................ G09B 23/30
434/262
2019/0057620 A1\* 2/2019 Eggert .................. G06T 19/006

FOREIGN PATENT DOCUMENTS

| KR | 10-1858659 A | 5/2018 |
| KR | 10-1973139 B1 | 4/2019 |
| KR | 10-1992603 B1 | 6/2019 |

\* cited by examiner

SIMULATOR FOR EMERGENCY TREATMENT TRAINING

CROSS-REFERENCE TO RELATED APPLICATION(S)

This application claims priority from Korean Patent Application No. 10-2021-0118604, filed on Sep. 6, 2021, in the Korean Intellectual Property Office, the disclosure of which is incorporated herein by reference in its entirety.

BACKGROUND

1. Field

The following description relates to a simulator for emergency treatment training, and more specifically, to a technology related to a simulator with which emergency treatment training is performed and evaluated under conditions similar to a real human body.

2. Description of Related Art

Emergency treatment refers to minimal treatment for traumas or diseases suddenly occurring at unexpected places or times. For example, emergency treatment includes hemostasis for trauma, cleaning of injuries, temporary fixation of fractures, and the like, and resuscitation such as artificial respiration and chest compression for cardiac arrest patients. The purpose of the emergency treatment is to increase an effect of the treatment required to restore a patient's life in an emergency situation when a physical abnormality is recognized.

Cardiopulmonary resuscitation is a treatment which restores a cardiopulmonary function and resuscitates the heart-lungs when the cardiopulmonary function is severely degraded or stopped. Since the brain is irreversibly damaged when 4 to 5 minutes elapse after cardiac arrest, a person who witnesses the cardiac arrest should immediately start cardiopulmonary resuscitation to resuscitate the cardiac arrest patient to a normal state. In addition, when an automated external defibrillator (AED) is installed nearby, a survival rate of the cardiac arrest patient may be increased by quickly performing automatic defibrillation on the patient.

Since the cardiopulmonary resuscitation and the automatic defibrillation are performed on the human body, it is not suitable for an operator or trainee to repeatedly practice the above procedure. Recently, apparatuses for practicing cardiopulmonary resuscitation using manikins having a shape similar to the human body or practicing the use of an AED (educational AED) have been proposed.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The proposed invention is directed to providing a simulator for emergency treatment training, which allows a trainee to realistically train for and evaluate cardiopulmonary resuscitation, such as chest compression, artificial respiration, and automatic defibrillation, and hemostatic compression so as to increase an emergency treatment training effect.

In one aspect of the present invention, a simulator for emergency treatment training includes a manikin, a chest compression training module, an artificial respiration training module, an automated external defibrillator training module, a hemostatic compression training module, a control unit, and a monitoring apparatus.

The manikin is formed in a shape similar to an upper body of the human body. The chest compression training module measures chest compression training information when chest compression training is performed using a trunk of the manikin. The artificial respiration training module measures respiration training information when artificial respiration training is performed using an oral cavity of the manikin. The automated external defibrillator training module measures pad attachment training information when automated external defibrillator training is performed using the trunk of the manikin. The hemostatic compression training module measures hemostatic compression training information when hemostatic compression training is performed using a skin wound model part provided on the trunk of the manikin. The control unit is installed in the trunk of the manikin and obtains pieces of training information from the chest compression training module, the artificial respiration training module, the automated external defibrillator training module, and the hemostatic compression training module. The monitoring apparatus is connected to the control unit in a wired or wireless manner, receives the pieces of the training information from the control unit, executes an evaluation program, generates an evaluation result, and displays the generated evaluation result on a screen.

DETAILED DESCRIPTION

Figure 1:
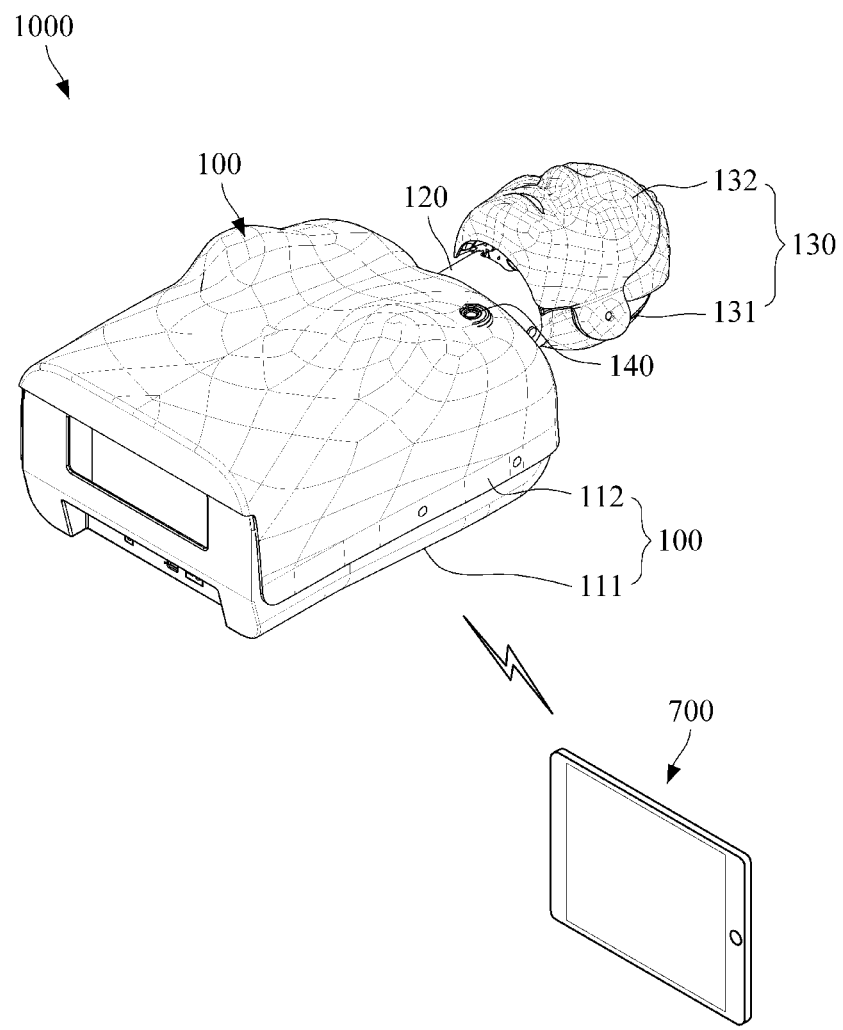
FIG. 1 is a configuration diagram illustrating a simulator for emergency treatment training according to one embodiment of the present invention.

Hereinafter, the invention will be described in detail with reference to the accompanying drawings. Here, like reference numerals denote like elements, and a repeated description and detailed descriptions of known functions and configurations that may unnecessarily obscure the gist of the invention will not be repeated. Embodiments of the invention are provided in order to fully explain the invention to those skilled in the art. Therefore, shapes and sizes of the elements in the drawings may be exaggerated for a more precise description.

Figure 2:
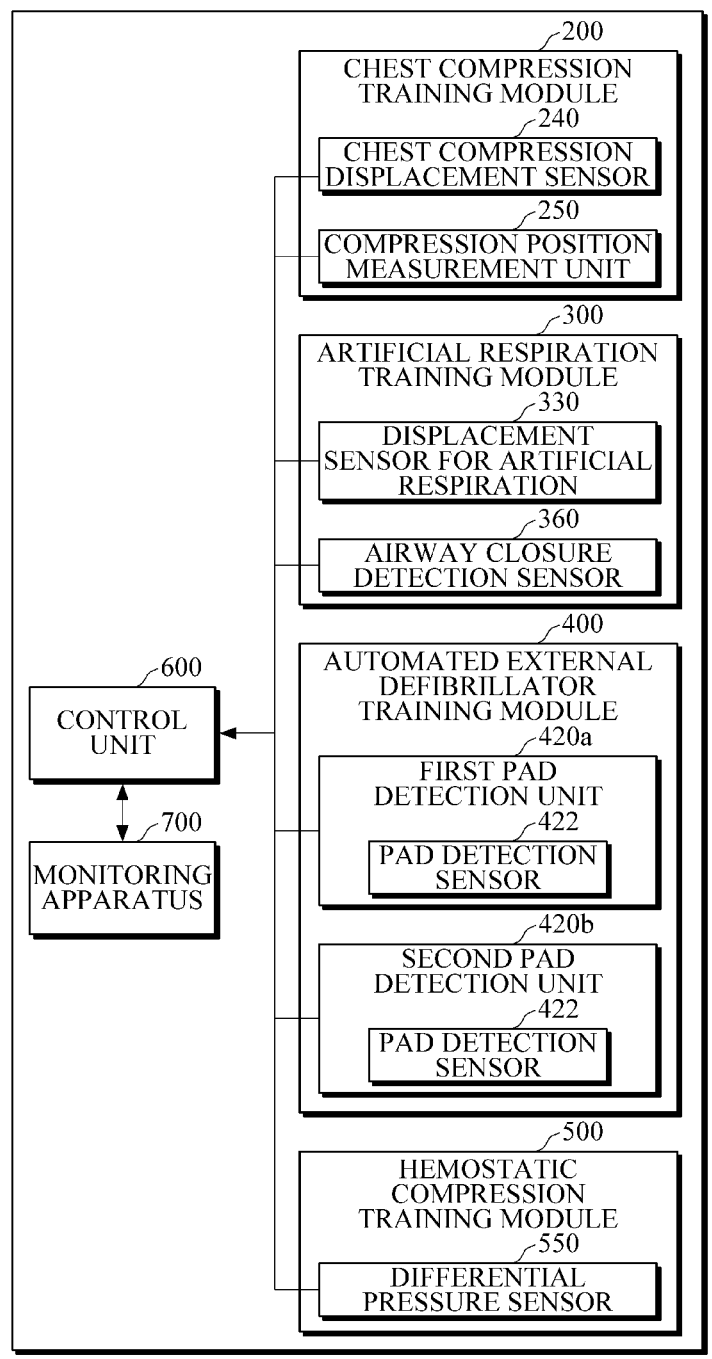
FIG. 2 is a control block diagram illustrating the simulator for emergency treatment training illustrated in FIG. 1.

FIG. 1 is a configuration diagram illustrating a simulator for emergency treatment training according to one embodiment of the present invention. FIG. 2 is a control block diagram illustrating the simulator for emergency treatment training illustrated in FIG. 1.

Referring to FIGS. 1 and 2, a simulator 1000 for emergency treatment training according to one embodiment of the present invention includes a manikin 100, a chest compression training module 200, an artificial respiration training module 300, an automated external defibrillator training module 400, a hemostatic compression training module 500, a control unit 600, and a monitoring apparatus 700.

The manikin 100 is formed in a shape similar to an upper body of the human body. The manikin 100 includes a trunk 110, a neck 120, and a head 130. The chest compression training module 200, the automated external defibrillator training module 400, and the hemostatic compression training module 500 are installed in the trunk 110. An outer portion of the trunk 110 may include a back plate 111 and trunk skin 112.

The trunk skin 112 may be formed of silicone or urethane rubber to resemble the skin of the human body. The trunk 110 includes a skin wound model part 140. The skin wound model part 140 fixedly passes through the trunk skin 112.

The neck 120 is connected to the trunk 110. The artificial respiration training module 300 is installed in the head 130 along with the trunk 110 and the neck 120. The head 130 includes an occipital area 131 and a facial area 132. The occipital area 131 is connected to the neck 120. Facial skin may be detached from and attached to the facial area 132. The facial skin may be formed of silicone, urethane rubber, or the like. The facial area 132 may be hinge-coupled to the occipital area 131 so that a chin moves upward and downward based on a state in which the manikin 100 lies horizontally.

The facial area 132 receives an elastic force from a head spring 133 (see FIGS. 3A and 3B) in a direction in which the chin is pulled downward. Accordingly, when a trainee applies a force to the chin of the facial area 132 with the hand to tilt the chin upward, and then removes the force, the facial area 132 may automatically return to an original state by the head spring 133. Meanwhile, the manikin 100 may be formed in a shape similar to the whole body of the human body.

The chest compression training module 200 measures chest compression training information when chest compression training is performed using the trunk 110 of the manikin 100. The chest compression training module 200 may provide the chest compression training information measured by a chest compression displacement sensor 240 and a compression position measurement unit 250 to the control unit 600.

The artificial respiration training module 300 measures respiration training information when artificial respiration training is performed using the oral cavity of the manikin 100. The artificial respiration training module 300 may provide the respiration training information measured by a displacement sensor 330 for artificial respiration and an airway closure detection sensor 360 to the control unit 600.

The automated external defibrillator training module 400 measures pad attachment training information when automated external defibrillator training is performed using the trunk 110 of the manikin 100. The automated external defibrillator training module 400 may provide the pad attachment training information measured by pad detection sensors 422 of first and second pad detection units 420a and 420b to the control unit 600.

The hemostatic compression training module 500 measures hemostatic compression training information when hemostatic compression training is performed using the skin wound model part 140 included in the trunk 110 of the manikin 100. The hemostatic compression training module 500 may provide the hemostatic compression training information measured by a differential pressure sensor 550 to the control unit 600.

The control unit 600 is installed in the trunk 110 of the manikin 100 and obtains pieces of training information from the chest compression training module 200, the artificial respiration training module 300, the automated external defibrillator training module 400, and the hemostatic compression training module 500.

The control unit 600 may be mounted on a circuit board and disposed in the trunk 110. A battery, a communication module, and the like may be installed in the trunk 110. The control unit 600 may obtain a compression position, a compression depth, a compression rate, and the number of compressions on the basis of the compression training information measured by the chest compression training module 200.

The control unit 600 may obtain a respiration volume, a respiration time, and the number of respirations on the basis of the respiration training information measured by the artificial respiration training module 300. In addition, the control unit 600 may obtain information about whether a pad is attached from the automated external defibrillator training module 400 and measure a pressure of hemostatic compression using the hemostatic compression training module 500.

The monitoring apparatus 700 is connected to the control unit 600 in a wired or wireless manner. The monitoring apparatus 700 receives the pieces of the training information from the control unit 600, executes an evaluation program, generates an evaluation result, and displays the generated evaluation result on a screen. The monitoring apparatus 700 may be provided as a smartphone, a tablet personal computer (PC), a smartwatch, or the like. The monitoring apparatus 700 may be connected to the control unit 600 through a cable or wireless communication module such as a Bluetooth or radio frequency (RF) module.

According to the above-described simulator 1000 for emergency treatment training, the trainee may realistically perform training for emergency treatment, such as cardiopulmonary resuscitation, using the chest compression training module 200, the artificial respiration training module 300, and the automated external defibrillator training module 400, and hemostatic compression using the hemostatic compression training module 500, the training information is visually displayed so that the trainee may perform self-study, the trainee may monitor a training result and evaluate the training result by analyzing monitored result data, and thus an emergency treatment training effect may be improved.

Figure 3A:
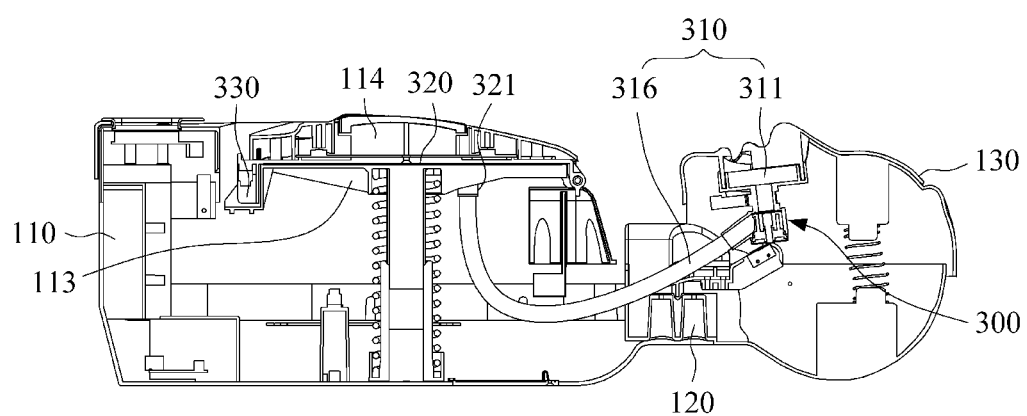
FIGS. 3A and 3B show cross-sectional views for describing an operation of an artificial respiration training module.
Figure 3B:
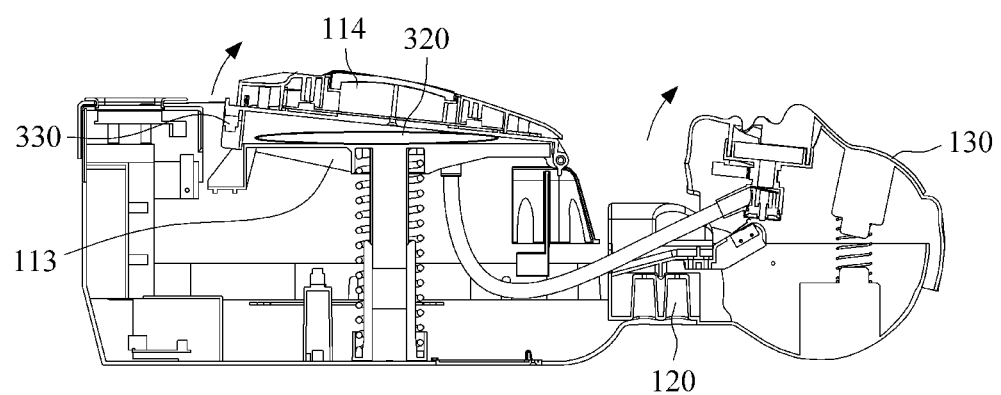
Figure 4A:
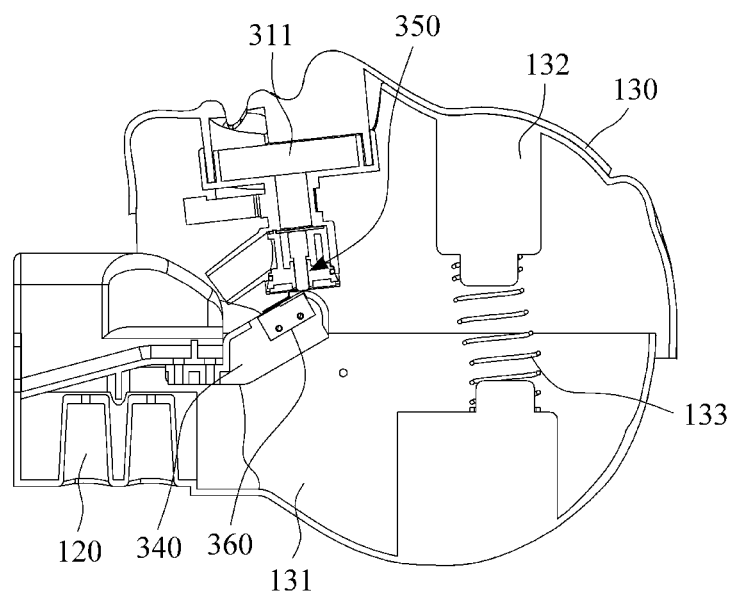
FIGS. 4A to 5B are cross-sectional views for describing an operation of a check valve in FIGS. 3A and 3B.
Figure 4B:
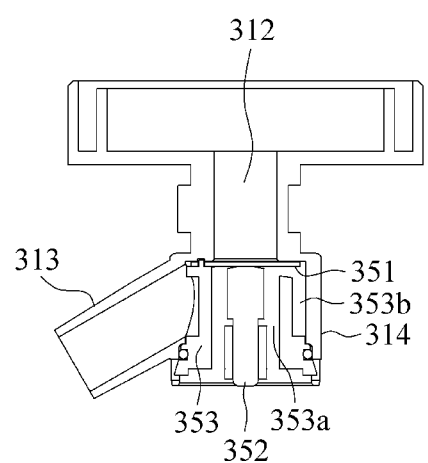
Figure 5A:
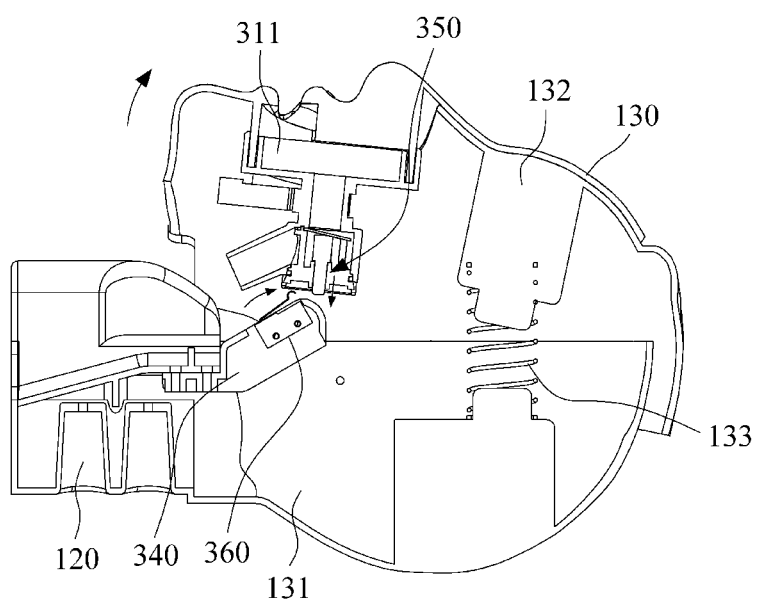
Figure 5B:
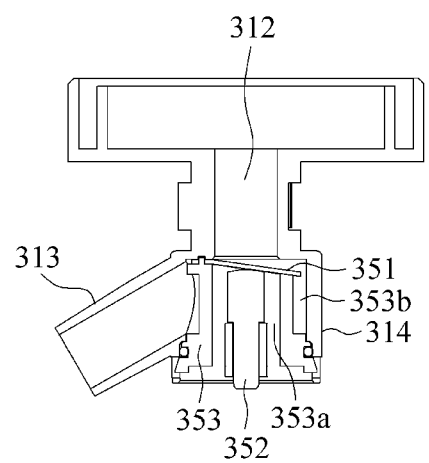

FIGS. 3A and 3B show cross-sectional views for describing an operation of the artificial respiration training module. FIGS. 4A to 5B are cross-sectional views for describing an operation of a check valve in FIGS. 3A and 3B.

Referring to FIGS. 3A to 5B, the artificial respiration training module 300 may include an artificial airway 310, an artificial lung bag 320, the displacement sensor 330 for artificial respiration, an airway closure unit 340, a check valve 350, and the airway closure detection sensor 360.

The artificial airway 310 is installed in the oral cavity of the manikin 100, and air flows into the artificial airway 310 by artificial respiration by the trainee. The artificial airway 310 may include an air injector 311 and a tube 316. In the air injector 311, the air is injected through an injection tube 312 and is discharged through a discharge tube 313. The air injector 311 may include a branched tube 314 branched off from the injection tube 312. The branched tube 314 may be equipped with the check valve 350. The tube 316 connects the discharge tube 313 and the artificial lung bag 320. The tube 316 may be flexibly formed in a creased shape or the like.

The artificial lung bag 320 is disposed between a first chest plate 113 and a second chest plate 114, which are hinge-coupled in the trunk 110 of the manikin 100. The artificial lung bag 320 stores the air introduced through the artificial airway 310 to rotate the second chest plate 114.

Based on the state in which the manikin 100 lies horizontally, the second chest plate 114 may be disposed above the first chest plate 113. An end portion, which is close to the neck 120, of the second chest plate 114 is connected to the first chest plate 113 by a hinge shaft parallel to a horizontal axis. The second chest plate 114 may be rotated upward and downward by expansion and contraction of the artificial lung bag 320 according to an air storage volume.

The artificial lung bag 320 may be fixed to the first chest plate 113 by a fixing connector 321. The fixing connector 321 is connected to the air injector 311 through the tube 316 so that the air flows into or from the artificial lung bag 320.

The displacement sensor 330 for artificial respiration measures a displacement of the second chest plate 114 according to the air storage volume of the artificial lung bag 320 and outputs the measured displacement to the control unit 600. The displacement sensor 330 for artificial respiration may be installed under the second chest plate 114. The displacement sensor 330 for artificial respiration may include one of various known displacement sensors.

When the trainee blows air through the oral cavity of the head by artificial respiration, the air flows into the artificial lung bag 320 through the artificial airway 310, and the artificial lung bag 320 moves upward so that a respiration volume may be measured by the displacement sensor 330 for measuring artificial respiration. The control unit 600 may obtain the respiration volume, the respiration time, and the number of respirations on the basis of information measured by the displacement sensor 330 for artificial respiration.

The airway closure unit 340 is installed in the neck 120 of the manikin 100. The airway closure unit 340 may allow training to open or close the artificial airway 310 to be performed in association with the check valve 350 as the head 130 of the manikin 100 is tilted toward the neck 120 or backward with respect to the neck 120.

The check valve 350 blocks or allows a flow of air through the artificial airway 310 in association with the airway closure unit 340 as the head 130 of the manikin 100 is tilted toward the neck 120 or backward with respect to the neck 120. The check valve 350 prevents air stored in the artificial lung bag 320 from flowing back to the oral cavity through the artificial airway 310.

For artificial respiration, the airway is opened in a head tilt-chin lift manner. Alternatively, in a state in which the neck is injured and the head should not move, the airway is opened by pulling the jaw forward in a jaw thrust manner.

When the head 130 is tilted backward in the head tilt-chin lift manner, the check valve 350 can be opened so that air may flow into the artificial lung bag 320, and when the head 130 is not tilted backward, the check valve 350 cannot be opened, and thus artificial respiration cannot be performed. Although not illustrated in the drawings, opening the airway in the jaw thrust manner may also be simulated by vertically moving the jaw of the facial area 132 upward.

The airway closure detection sensor 360 measures whether the artificial airway 310 is closed as the head 130 of the manikin 100 is tilted toward the neck 120 or backward with respect to the neck 120 and outputs whether the artificial airway 310 is closed to the control unit 600. The airway closure detection sensor 360 may be disposed in the airway closure unit 340 and may measure a position of the facial area 132 with respect to the occipital area 131. The airway closure detection sensor 360 may be provided as one of various sensors such as a contact type switch sensor or non-contact sensor such as a photo interrupter in which there is no mechanical friction.

When the facial area 132 is not tilted backward, the airway closure detection sensor 360 may determine that the airway is closed and transmit a signal to the control unit 600. And when the facial area 132 is tilted backward, the airway closure detection sensor 360 may determine that the airway is opened and transmit a signal to the control unit 600. Accordingly, airway opening and closing training information of the trainee may be provided to the control unit 600. Although not illustrated in the drawings, the information detected by the airway closure detection sensor 360 may be displayed on the monitoring apparatus 700 through the control unit 600, and an automatic valve may be provided to open or close the airway.

As an example, the check valve 350 may include a backflow prevention membrane 351, a backflow prevention pin 352, and a backflow prevention guide 353. The backflow prevention membrane 351 operates to open a flow path of the artificial airway by an air injection force according to artificial respiration in a state in which the head 130 of the manikin 100 is tilted backward with respect to the neck 120 while maintaining a state in which the flow path of the artificial airway 310 is closed by an elastic force.

The backflow prevention membrane 351 may be formed of an elastic material such as silicone or urethane rubber. One end of the backflow prevention membrane 351 may be fixed to the vicinity of an outlet of the injection tube 312 of the air injector 311 and rotated to open or close the outlet of the injection tube 312. The outlet of the injection tube 312 is connected to an inlet of the branched tube 314.

The backflow prevention pin 352 operates to push the head 130 of the manikin 100 by the airway closure unit 340 so as to prevent the backflow prevention membrane 351 from being opened in a state in which the head 130 of the manikin 100 is tilted toward the neck 120. The backflow prevention pin 352 operates to be spaced apart from the airway closure unit 340 so as to allow the backflow prevention membrane 351 to be opened in the state in which the head 130 of the manikin 100 is tilted backward with respect to the neck 120. The backflow prevention pin 352 may be guided by the backflow prevention guide 353 to enter and exit the branched tube 314.

The backflow prevention guide 353 is installed in the flow path of the artificial airway 310 to guide movement of the backflow prevention pin 352. The backflow prevention guide 353 allows air to be supplied to the artificial lung bag 320 through an air supply path 353b according to an opening operation of the backflow prevention membrane 351 in a state in which the exhaust path 353a is closed. The backflow prevention guide 353 discharges air, which flows backward to the air supply path 353b from the artificial lung bag 320 when the exhaust path 353a is opened according to a closing operation of the backflow prevention membrane 351, to the outside.

The exhaust path 353a is formed to pass through an inner portion of the backflow prevention guide 353. A surface, which faces the backflow prevention membrane 351, of the backflow prevention guide 353 is inclined. An inlet of the exhaust path 353a may be closed according to the opening operation of the backflow prevention membrane 351 and opened according to the closing operation of the backflow prevention membrane 351. The inner portion of the backflow prevention guide 353 may be spaced apart from an inner surface of the branched tube 314 to form the air supply path 353b. An outer portion of the backflow prevention guide 353 is sealed along the vicinity of an outlet of the branched tube 314.

The check valve 350 may operate as follows. In a state in which the airway is opened in the head tilt-chin lift or jaw thrust manner, the backflow prevention pin 352 moves downward along the backflow prevention guide 353, and the backflow prevention membrane 351 is moved downward by air pressure to move air to the artificial lung bag 320. In this case, the backflow prevention membrane 351 is an elastic member and blocks air flowing upward again to the oral cavity of the artificial airway 310, and the air supplied to the artificial lung bag 320 is discharged to the outside through the exhaust path 353a of the backflow prevention guide 353.

When the trainee applies a force to tilt the facial area 132 backward with a hand and then remove the force, the facial area 132 is automatically returned to an original state by the head spring 133 to close the airway. In this case, the backflow prevention pin 352 is moved upward by the airway closure unit 340 along the backflow prevention guide 353, the backflow prevention membrane 351 is forcibly closed, and thus air may not flow from the oral cavity through the artificial airway 310.

Figure 6:
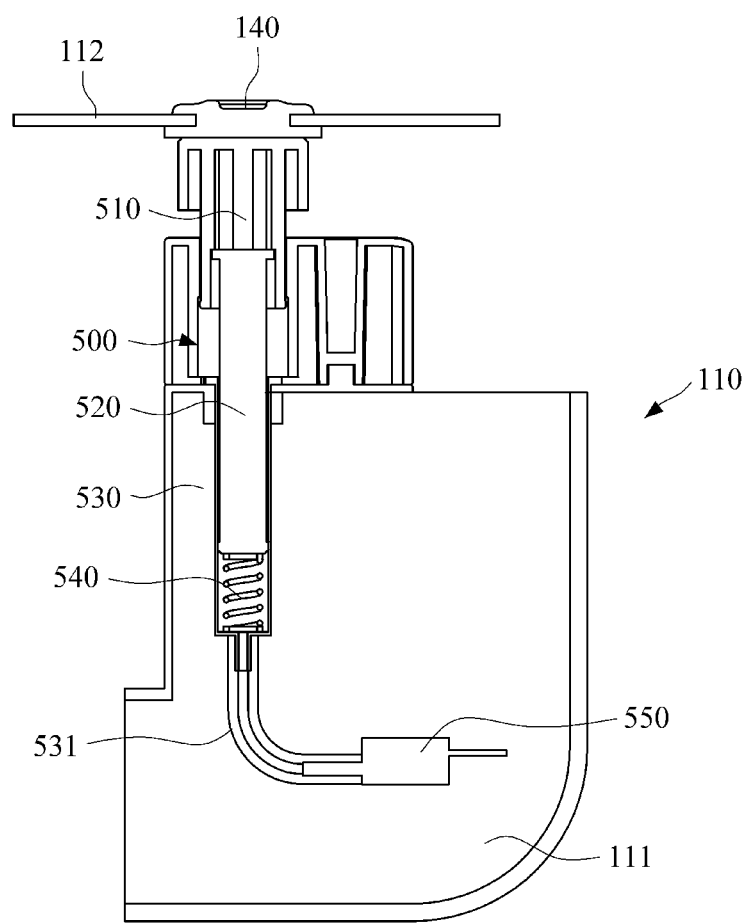
FIG. 6 is a cross-sectional view illustrating a hemostatic compression training module.

FIG. 6 is a cross-sectional view illustrating the hemostatic compression training module.

Referring to FIG. 6, the hemostatic compression training module 500 may include a push plate 510, a piston 520, a piston housing 530, a hemostatic compression spring 540, and the differential pressure sensor 550.

Based on the state in which the manikin 100 lies horizontally, the push plate 510 is fixed to a lower side of the skin wound model part 140 and disposed in the trunk 110. In a state in which the piston 520 is fixed to a lower side of the push plate 510 and disposed in the trunk 110, the piston 520 operates to be moved downward according to compression on the skin wound model part 140.

The piston housing 530 is fixed to the trunk 110 in a state in which the piston 520 is fitted to an upper opening of the piston housing 530, and an internal pressure of the piston housing 530 is changed according to downward movement of the piston 520. A sealing member may be installed around an outer circumference of the piston 520. An inner circumference of the piston housing 530 is formed to have a size to guide upward and downward movement of the piston 520 in a state in which the piston housing 530 presses against the sealing member of the piston 520 to be sealed. A lower end of the piston housing 530 is connected to an air tube 531 so that an inner portion of the piston housing 530 communicates with the air tube 531.

The hemostatic compression spring 540 returns the piston 520 when compression on the skin wound model part 140 is decompressed. The hemostatic compression spring 540 may be disposed in the piston housing 530 and may apply an elastic force in a direction in which the piston 520 is moved upward. The hemostatic compression spring 540 may be formed as a compression coil spring.

The differential pressure sensor 550 measures a change in pressure in the piston housing 530 and outputs the measured change to the control unit 600. The differential pressure sensor 550 may be installed in the air tube 531 and may measure a difference between an internal pressure of the piston housing 530 and an atmospheric pressure.

The hemostatic compression training module 500 may operate as follows. When trainee pushes the skin wound model part 140, the piston 520 is moved downward by the push plate 510, a change in internal pressure of the piston housing 530 is measured by the differential pressure sensor 550 and provided to the control unit 600. When the compression is removed from the skin wound model part 140, the piston 520 is returned by the hemostatic compression spring 540, and information of the differential pressure sensor 550 is initialized. In this process, the control unit 600 may obtain a pressure of hemostatic compression through the differential pressure sensor 550.

Meanwhile, as an example of the hemostatic compression training, in order to pressurize a person for hemostasis of a specific part of the person, a pressure greater than or equal to a systolic blood pressure should be directly applied for hemostasis, and this information may be provided to the trainee through the control unit 600.

Figure 7:
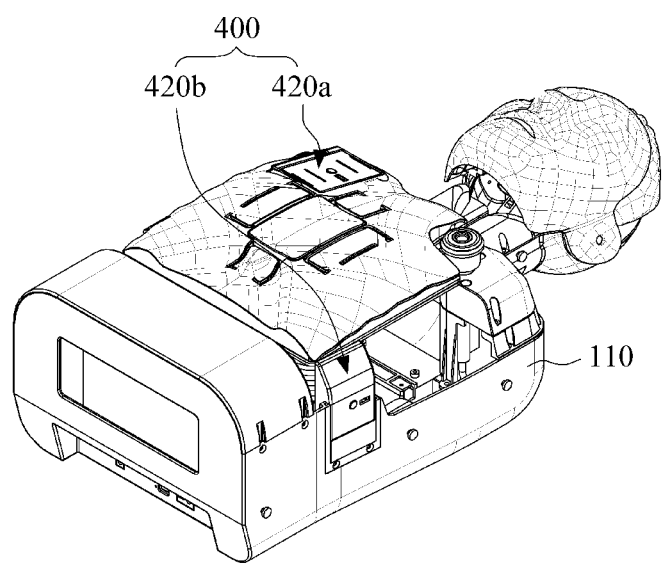
FIG. 7 is a configuration diagram illustrating an example in which first and second pad detection units of an automated external defibrillator training module are installed on a manikin.
Figure 8:
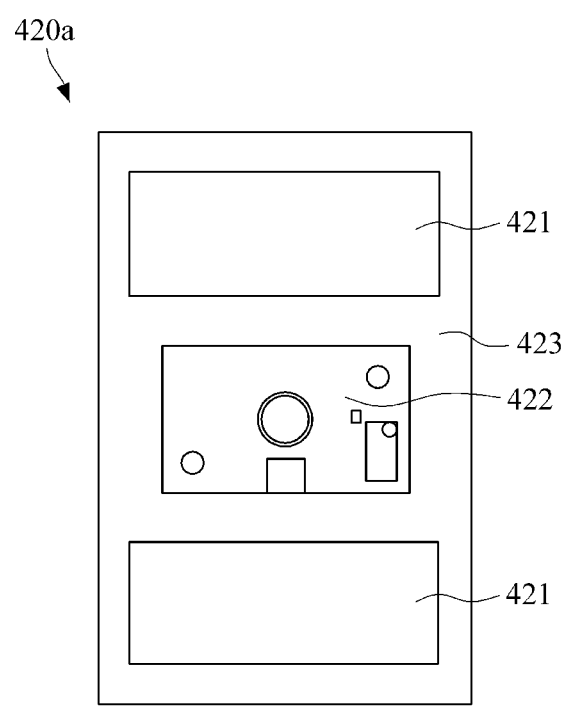
FIG. 8 is a configuration diagram illustrating the first pad detection unit illustrated in FIG. 7.
Figure 9:
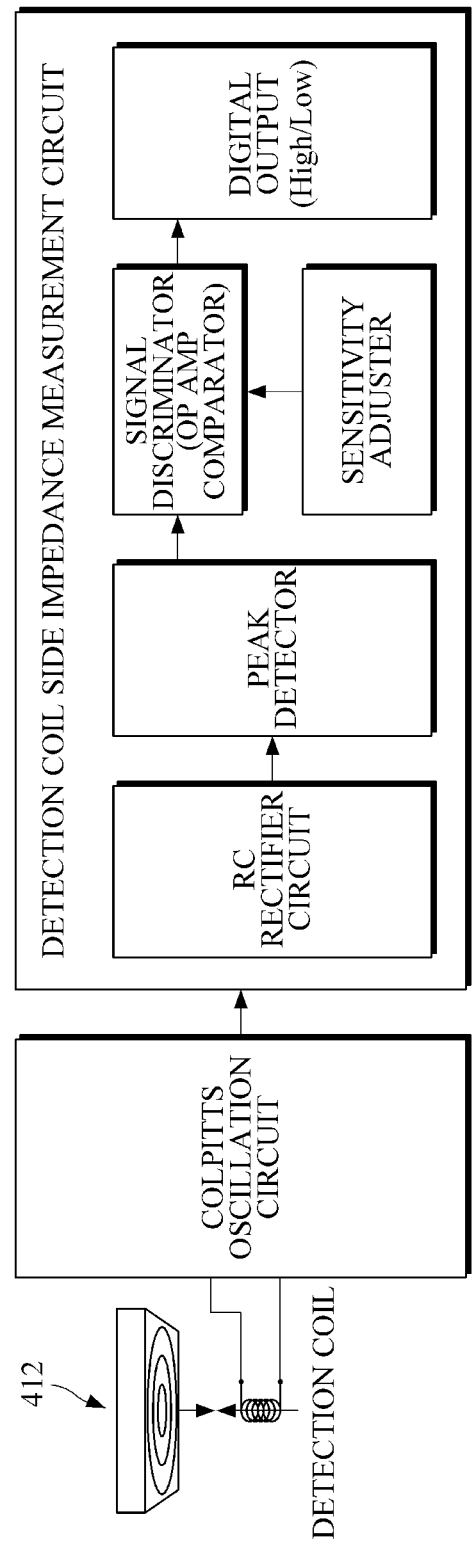
FIG. 9 is a block diagram illustrating a pad detection sensor illustrated in FIG. 8.
Figure 10:
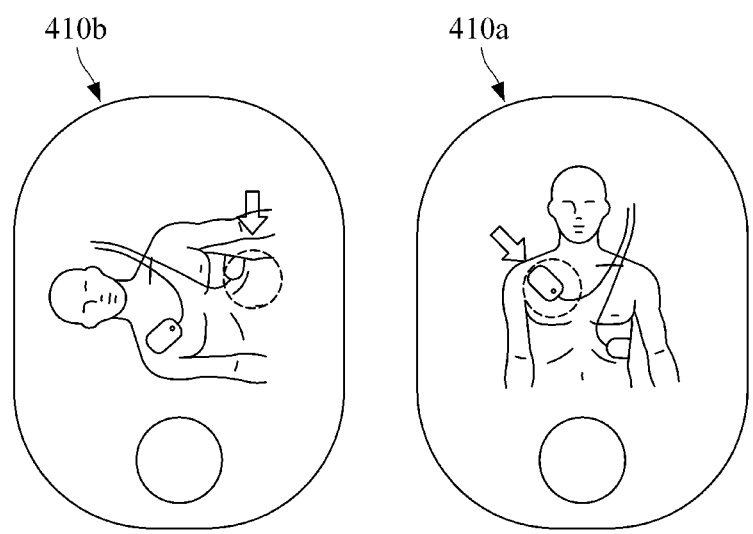
FIG. 10 is a plan view illustrating first and second training pads.
Figure 11:
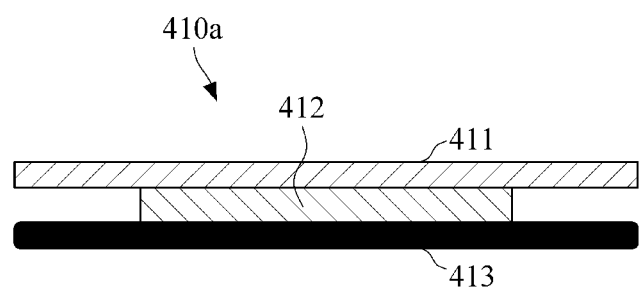
FIG. 11 is a cross-sectional view illustrating the first training pad illustrated in FIG. 10.
Figure 12:
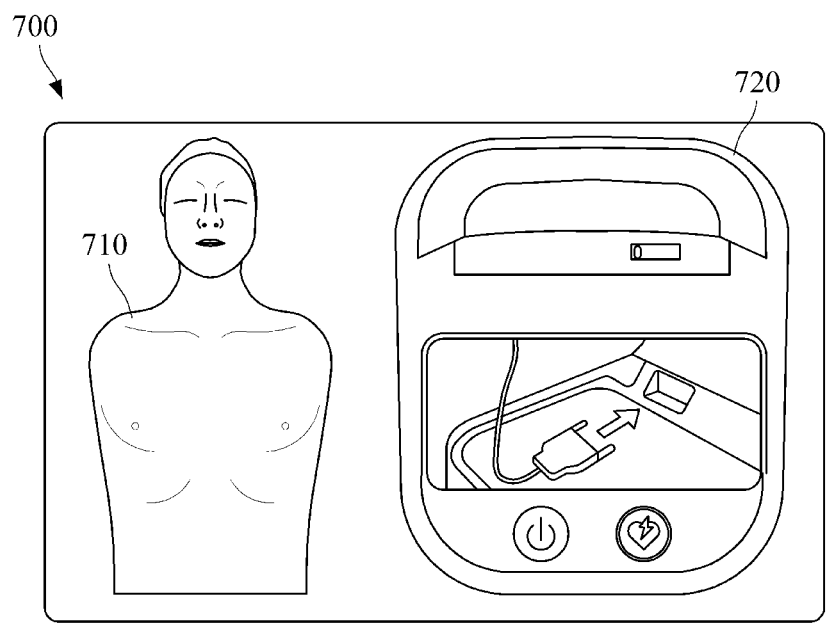
FIG. 12 is a view illustrating an example in which a virtual automated external defibrillator training scenario is shown on a monitoring apparatus.

FIG. 7 is a configuration diagram illustrating an example in which the first and second pad detection units of the automated external defibrillator training module are installed on the manikin. FIG. 8 is a configuration diagram illustrating the first pad detection unit illustrated in FIG. 7. FIG. 9 is a block diagram illustrating the pad detection sensor illustrated in FIG. 8. FIG. 10 is a plan view illustrating first and second training pads. FIG. 11 is a cross-sectional view illustrating the first training pad illustrated in FIG. 10. FIG. 12 is a view illustrating an example in which a virtual automated external defibrillator training scenario is shown on the monitoring apparatus;

Referring to FIGS. 7 to 12, the automated external defibrillator training module 400 may include first and second training pads 410a and 410b and first and the second pad detection units 420a and 420b.

The first training pad 410a includes a position display plate 411 which displays a position, at which the corresponding pad is attached, on a surface thereof, a non-ferrous metal plate 412 attached to a rear surface of the position display plate 411, and a flexible iron plate 413 attached to a rear surface of the non-ferrous metal plate 412. A structure of the second training pad 410b is the same as the structure of the first training pad 410a.

The position display plate 411 guides the corresponding training pad to be attached at an exact position when the automated external defibrillator is actually used. The position display plate 411 may be formed of a plastic material or the like. The non-ferrous metal plate 412 has a thin thickness, is smaller than the position display plate 411, and is positioned at a center of the position display plate 411. The non-ferrous metal plate 412 is formed of a non-ferrous metal such as aluminum, copper, or the like. The non-ferrous metal plates 412 allow information, in which the pad detection sensors 422 of the first and second pad detection units 420*a* and 420*b* recognize non-ferrous material components, to be provided to the control unit 600.

The flexible iron plate 413 may be formed to have a size which is the same as a size of the position display plate 411. The flexible iron plates 413 include iron components and are attached to magnets 421 of the first and second pad detection units 420*a* and 420*b* to form the first and second training pads 410*a* and 410*b* which are semi-permanently usable.

The first and second pad detection units 420*a* and 420*b* include the magnets 421 to which the corresponding flexible iron plates 413 are attached by a magnetic force and the pad detection sensors 422 configured to detect the corresponding non-ferrous metal plates 412. The first and second pad detection units 420*a* and 420*b* are disposed under the right clavicle and under the left nipple of the manikin 100. The first and second pad detection units 420*a* and 420*b* detect whether the first and second training pads 410*a* and 410*b* are attached thereto. The control unit 600 may obtain information whether the pads are attached on the basis of information detected by the first and second pad detection units 420*a* and 420*b*.

The pad detection sensor 422 may be mounted at a center of the circuit board 423. The magnets 421 may be installed at both sides of the circuit board 423 with the pad detection sensor 422 interposed therebetween. The pad detection sensor 422 is provided as a sensor capable of detecting a non-ferrous metal in a non-contact manner. As an example, the pad detection sensor 422 may be configured as a high-frequency oscillation eddy current detection type sensor. When a current flows through a detection coil of a Colpitts oscillation circuit, a high-frequency electromagnetic field is generated. In this case, the non-ferrous metal plate 412 of each of the first and second training pads 410*a* and 410*b* approaches the outside of the high-frequency electromagnetic field, the eddy current is generated in a surface of the non-ferrous metal plate 412, and a secondary electromagnetic field of which a direction is opposite to a direction of a primary electromagnetic field is generated.

The change in secondary electromagnetic field changes an impedance of the detection coil, and whether each of the first and second training pads 410*a* and 410*b* is attached thereto may be checked by a circuit configured to detect the change in impedance. A change amount of the impedance may be changed according to a metal.

An impedance measurement circuit for the detection coil may include a resistor-capacitor (RC) rectifier circuit which converts a high-frequency signal to a direct current signal, a peak detector which detects a peak of a signal output by the RC rectifier circuit, and a signal discriminator (operational amplifier (OP AMP) comparator) for discriminating a signal output from the peak detector as a digital signal.

The impedance measurement circuit for the detection coil may include a sensitivity adjustor for adjusting an effective detection range and an effective detection distance of each of the first and second training pads 410*a* and 410*b*. The sensitivity adjuster may be provided as one of various known circuits each including a variable resistor and the like.

According to an additional aspect, the monitoring apparatus 700 is equipped with a virtual automated external defibrillator training scenario to allow training to be performed in association with pad detection information of the pad detection sensors. As an example, the screen of the monitoring apparatus 700 is formed as a touch input type screen. In the monitoring apparatus 700, an upper body model 710 similar to the manikin 100 and a virtual automated external defibrillator 720 are displayed on the screen.

When the trainee attaches the first and second training pads 410*a* and 410*b* to the first and second pad detection units 420*a* and 420*b*, whether the pads are attached thereto are displayed on the upper body model 710 similar to the manikin 100. The virtual automated external defibrillator 720 may have the same scenario as that of a real automated external defibrillator. When the trainee pushes a power button of the virtual automated external defibrillator 720 and attaches the first and second training pads 410*a* and 410*b* to the first and second pad detection units 420*a* and 420*b* disposed under the right clavicle and under the left nipple, a patient's heart rhythm is automatically analyzed.

When defibrillation is required, a defibrillation execution message appears, and when electricity is charged and a defibrillation button is pushed, the virtual automated external defibrillator 720 may be operated. In addition, a scenario of performing the defibrillation and cardiopulmonary resuscitation and repeatedly performing the defibrillation may be provided. The present invention is not limited to the illustrated scenarios, various automated external defibrillator usage scenarios may be provided.

Figure 13:
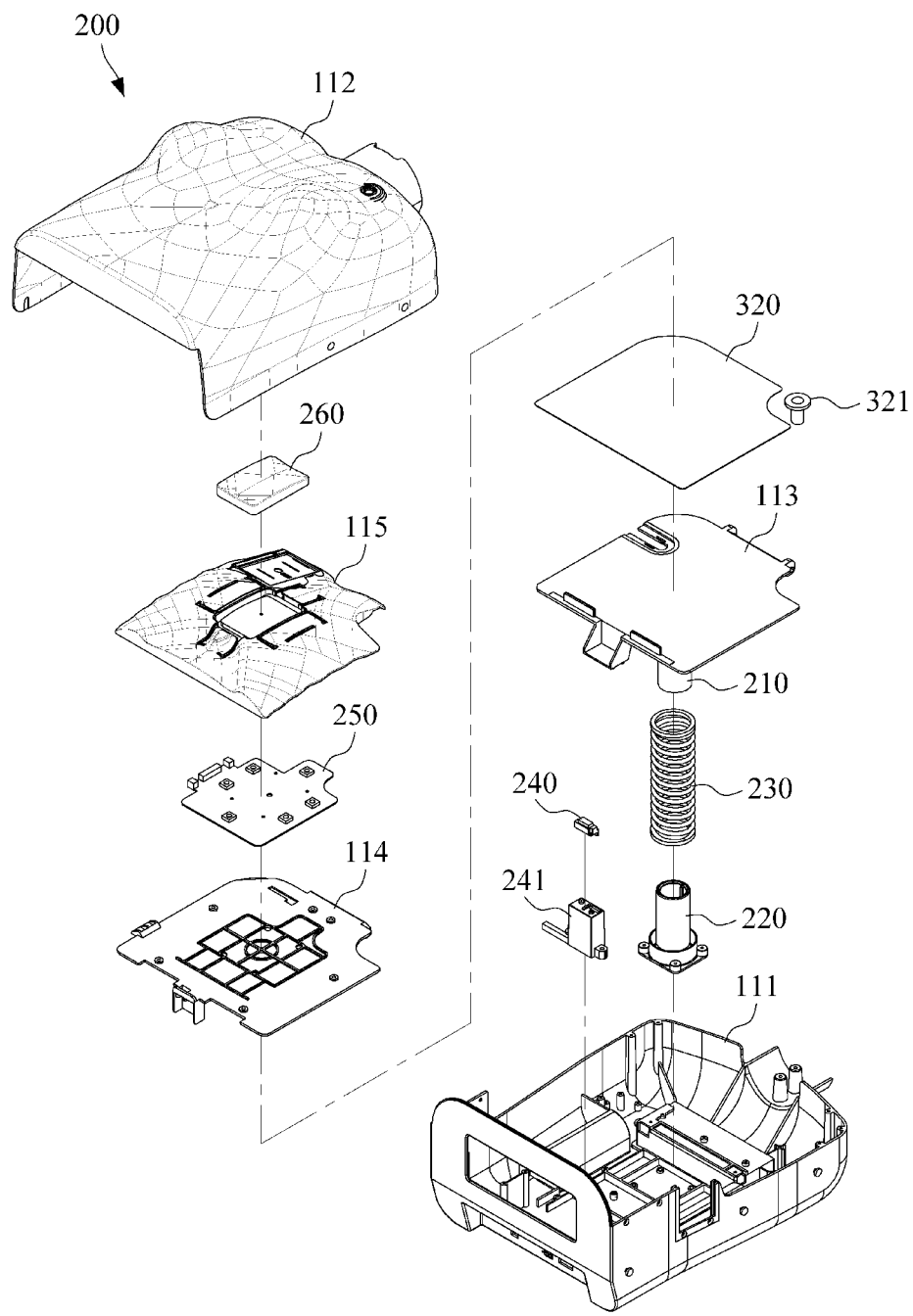
FIG. 13 is an exploded perspective view illustrating an example in which a chest compression training module is installed on a trunk of the manikin.
Figure 14A:
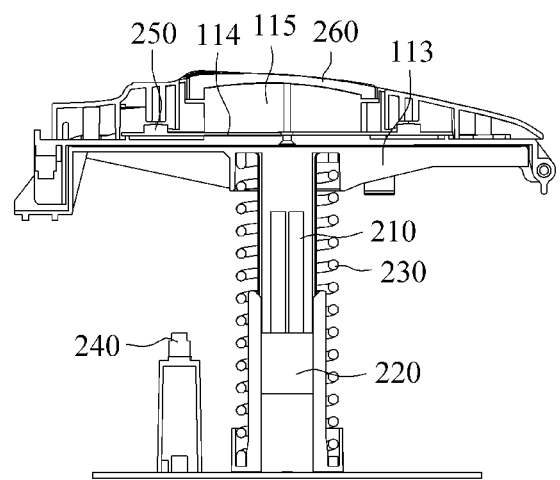
FIGS. 14A and 14B show cross-sectional views for describing an operation of the chest compression training module illustrated in FIG. 13.
Figure 14B:
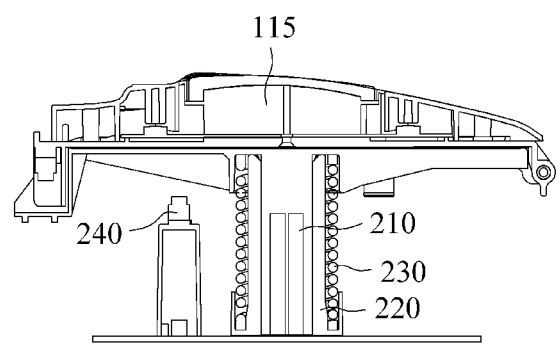
Figure 15:
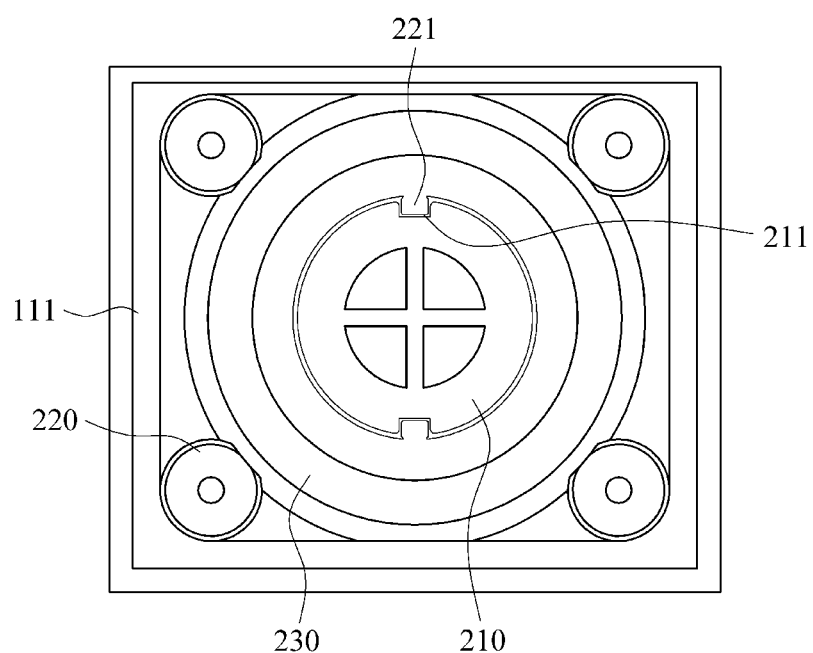
FIG. 15 is a cross-sectional view illustrating a part of the chest compression training module.

FIG. 13 is an exploded perspective view illustrating an example in which the chest compression training module is installed on the trunk of the manikin. FIGS. 14A and 14B show cross-sectional views for describing an operation of the chest compression training module illustrated in FIG. 13. FIG. 15 is a cross-sectional view illustrating a part of the chest compression training module.

Referring to FIGS. 13 to 15, the chest compression training module 200 may include a movable guide 210, a fixed guide 220, a chest compression spring 230, the chest compression displacement sensor 240, the compression position measurement unit 250, and a compression shock absorber 260.

Based on the state in which the manikin 100 lies horizontally, the movable guide 210 protrudes from a lower side of the first chest plate 113 disposed in the trunk 110 and moves vertically according to compression or decompression on the first chest plate 113. The movable guide 210 may be formed in the form of a circular rod. The movable guide 210 may include guide grooves 211 formed in an outer surface thereof to extend vertically and have a predetermined cross-sectional shape.

The fixed guide 220 guides the movable guide 210 to move vertically in the trunk 110 of the manikin 100. The fixed guide 220 may be formed so that the movable guide 210 is fitted to a circular hollow of the fixed guide 220. Guide protrusions 221 are formed on an inner surface of the hollow of the fixed guide 220 and fitted to the guide grooves 211.

The fixed guide 220 may guide the movable guide 210 to move vertically such that the movable guide 210 does not twist laterally using the guide protrusions 221 and the guide grooves 211. The guide groove 211 may also be formed in the fixed guide 220, and the guide protrusion 221 may also be formed on the movable guide 210.

The chest compression spring 230 returns the first chest plate 113 according to decompression on the first chest plate 113. The chest compression spring 230 may be formed as a compression coil spring and disposed to surround an outer circumference of the fixed guide 220. Upper and lower ends of the chest compression spring 230 are fitted to and supported by the first chest plate 113 and support grooves of the fixed guide 220.

The chest compression displacement sensor 240 measures a displacement of the first chest plate 113 when the first chest plate 113 is compressed and outputs the measured displacement to the control unit 600. The chest compression displacement sensor 240 is fixed to the back plate 111 by a fixing bracket 241 and measures a height of the first chest plate 113 so that the displacement of the first chest plate 113 may be measured.

The control unit 600 may obtain a compression position, a compression depth, a compression rate, and the number of compressions on the basis of information measured by the chest compression displacement sensor 240. The chest compression displacement sensor 240 may be provided as one of various known displacement sensors.

The compression position measurement unit 250 is disposed between the second chest plate 114 and a third chest plate 115 which are sequentially disposed above the first chest plate 113, measures a compression position of the trainee according to compression on the third chest plate 115, and outputs the measured compression position to the control unit 600.

The third chest plate 115 may be implemented with a rib shape similar to the human body, may include a xiphoid process formed therein, and may be fixed to the compression position measurement unit 250. When a force is applied by a protrusion having a cantilever structure formed on the third chest plate 115, the compression position measurement unit 250 may detect whether the hand is positioned at an upper side, a lower side, a left side, or a right side when the chest is compressed and may provide the position of the hand to the control unit 600.

The control unit 600 may determine whether the compression position is normal on the basis of information measured by the compression position measurement unit 250. The compression position measurement unit 250 may have a configuration in which position sensors are mounted at an upper side, a lower side, a left side, and a right side of a support plate. The position sensor may be provided as one of various known position sensors.

The compression shock absorber 260 is disposed between the third chest plate 115 and the trunk skin 112 to absorb a compression shock. The compression shock absorber 260 is formed of silicone, urethane rubber, or the like, is fixed to the third chest plate 115. The compression shock absorber 260 absorbs a shock from the palm when the chest is compressed at an exact chest compression position, and protects the compression position measurement unit 250.

Figure 16:
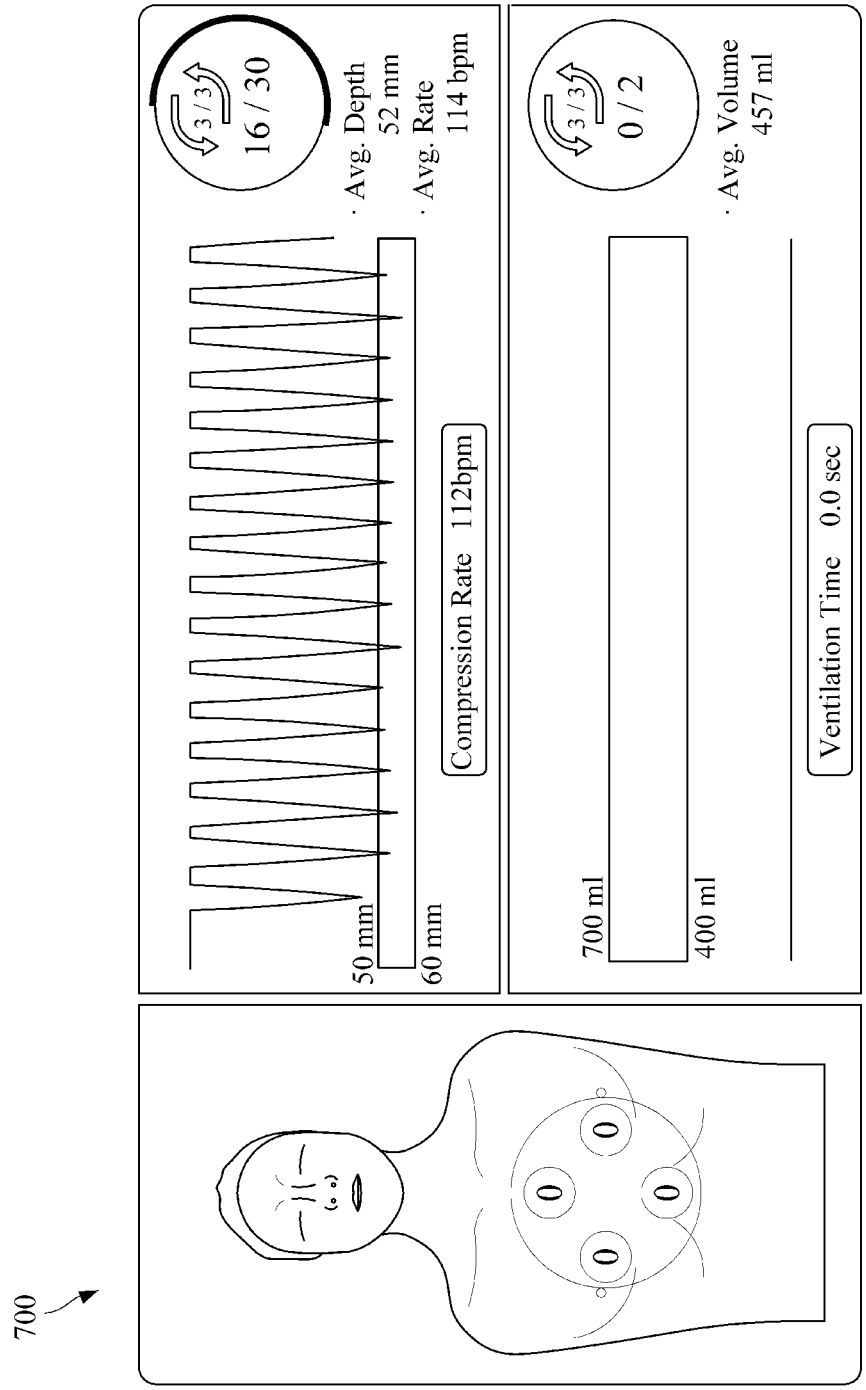
FIG. 16 is a view illustrating a screen layout of the monitoring apparatus.

FIG. 16 is a view illustrating a screen layout of the monitoring apparatus.

Referring to FIG. 16, according to general cardiopulmonary resuscitation guidelines, for example, 2020 American Heart Association (AHA) guidelines, it is specified that the chest compression is performed so that a ratio of the chest compressions to artificial respiration is 30:2, a chest compression depth is in the range of 5 to 6 cm, and a chest compression rate is in the range of 100 revolutions/minute to 120 revolutions/minute, and the artificial respiration is performed for 1 to 2 seconds so that the chest is sufficiently relaxed. Compliance with the cardiopulmonary resuscitation guidelines may be checked using the screen of the monitoring apparatus 700.

According to the present invention, a trainee can realistically perform training for emergency treatment, such as cardiopulmonary resuscitation using a chest compression training module, an artificial respiration training module, and an automated external defibrillator training module, and hemostatic compression using a hemostatic compression training module, training information can be visually displayed so that self-study can be realized, a training result can be monitored, monitored result data can be analyzed and evaluated, and thus, an emergency treatment training effect can be improved.

The present invention has been described with reference to one embodiment illustrated in the accompanying drawings, but this is only an example. It will be understood by those skilled in the art that various modifications and equivalent other example embodiments may be made. Therefore, the scope of the present invention is defined by the appended claims.

What is claimed is:

1. A simulator for emergency treatment training, comprising:
    a manikin formed in a shape similar to an upper body of a human body;
    a chest compression training module which measures chest compression training information when chest compression training is performed using a trunk of the manikin;
    an artificial respiration training module which measures respiration training information when artificial respiration training is performed using an oral cavity of the manikin;
    an automated external defibrillator training module which measures pad attachment training information when automated external defibrillator training is performed using the trunk of the manikin;
    a hemostatic compression training module which measures hemostatic compression training information when hemostatic compression training is performed using a skin wound model part provided on the trunk of the manikin;
    a control unit which is installed in the trunk of the manikin and obtains pieces of training information from the chest compression training module, the artificial respiration training module, the automated external defibrillator training module, and the hemostatic compression training module; and
    a monitoring apparatus which is connected to the control unit in a wired or wireless manner, receives the pieces of the training information from the control unit, executes an evaluation program, generates an evaluation result, and displays the generated evaluation result on a screen.

2. The simulator of claim 1, wherein the artificial respiration training module includes:
    an artificial airway which is installed in the oral cavity of the manikin and through which air flows according to artificial respiration by a trainee;
    an artificial lung bag which is disposed between a first chest plate and a second chest plate, which are hinge-coupled in the trunk of the manikin, and stores the air introduced through the artificial airway to rotate the second chest plate;
    a displacement sensor for artificial respiration, which measures a displacement of the second chest plate according to an air storage volume of the artificial lung bag and outputs the measured displacement to the control unit;
    an airway closure unit installed in a neck of the manikin;
    a check valve, which blocks or allows a flow of the air through the artificial airway in association with the airway closure unit as a head of the manikin is tilted toward the neck or backward with respect to the neck and prevents the air stored in the artificial lung bag from flowing back to the oral cavity through the artificial airway; and an airway closure detection sensor which measures whether the artificial airway is closed as the head of the manikin is tilted toward the neck or backward with respect to the neck and outputs the whether the artificial airway is closed to the control unit.

3. The simulator of claim 2, wherein the check valve includes:
 a backflow prevention membrane which operates to open a flow path of the artificial airway by an air injection force according to artificial respiration in a state in which the head of the manikin is tilted backward with respect to the neck while maintaining a state in which the flow path of the artificial airway is closed by an elastic force;
 a backflow prevention pin which operates to push the head of the manikin by the airway closure unit to prevent the backflow prevention membrane from being opened in a state in which the head of the manikin is tilted toward the neck and operates to be spaced apart from the airway closure unit to allow the backflow prevention membrane to be opened in the state in which the head of the manikin is tilted backward with respect to the neck; and
 a backflow prevention guide, which is installed in the flow path of the artificial airway, guides movement of the backflow prevention pin, supplies air to the artificial lung bag through an air supply path in a state in which an exhaust path is closed according to an opening operation of the backflow prevention membrane, and discharges the air flowing backward from the artificial lung bag to the air supply path when the exhaust path is opened according to a closing operation of the backflow prevention membrane.

4. The simulator of claim 1, wherein the hemostatic compression training module includes:
 a push plate fixed to a lower side of the skin wound model part and disposed in the trunk based on a state in which the trunk of the manikin lies horizontally;
 a piston which is fixed to a lower side of the push plate, disposed in the trunk, and moved downward according to compression on the skin wound model part;
 a piston housing which is fixed inside the trunk and of which an internal pressure is changed according to downward movement of the piston in a state in which the piston is fitted to an upper opening of the piston housing;
 a hemostatic compression spring which returns the piston according to decompression on the skin wound model part; and
 a differential pressure sensor which measures a change in internal pressure of the piston housing and outputs the measured change to the control unit.

5. The simulator of claim 1, wherein the automated external defibrillator training module includes:
 first and second training pads each including a position display plate which displays a corresponding pad attachment position, a non-ferrous metal plate attached to a rear surface of the position display plate, and a flexible iron plate attached to a rear surface of the non-ferrous metal plate;
 first and second pad detection units which include magnets, to which the corresponding flexible iron plates are attached by a magnetic force, and pad detection sensors which detect the corresponding non-ferrous metal plates and are disposed under a right clavicle and under a left nipple of the manikin.

6. The simulator of claim 5, wherein the monitoring apparatus is equipped with a virtual automated external defibrillator training scenario to allow training to be performed in association with pad detection information obtained through the pad detection sensors.

7. The simulator of claim 1, wherein the chest compression training module includes:
 a movable guide which protrudes from a lower side of a first chest plate and moves vertically according to compression or decompression on the first chest plate based on a state in which the trunk of the manikin lies horizontally;
 a fixed guide which guides the movable guide to move vertically in the trunk of the manikin;
 a chest compression spring which returns the first chest plate according to the decompression on the first chest plate;
 a chest compression displacement sensor which measures a displacement of the first chest plate when the first chest plate is compressed and outputs the measured displacement to the control unit;
 a compression position measurement unit which is disposed between a second chest plate and a third chest plate sequentially disposed above the first chest plate, measures a compression position of a trainee according to compression on the third chest plate, and outputs the measured compression position to the control unit; and
 a compression shock absorber which is disposed between the third chest plate and trunk skin and absorbs a compression shock.

* * * * *